May 8, 1934.    C. L. BRACKETT    1,958,180
COUPLING MECHANISM FOR WASHERS AND HEADED FASTENERS
Original Filed Feb. 21, 1931    3 Sheets-Sheet 1
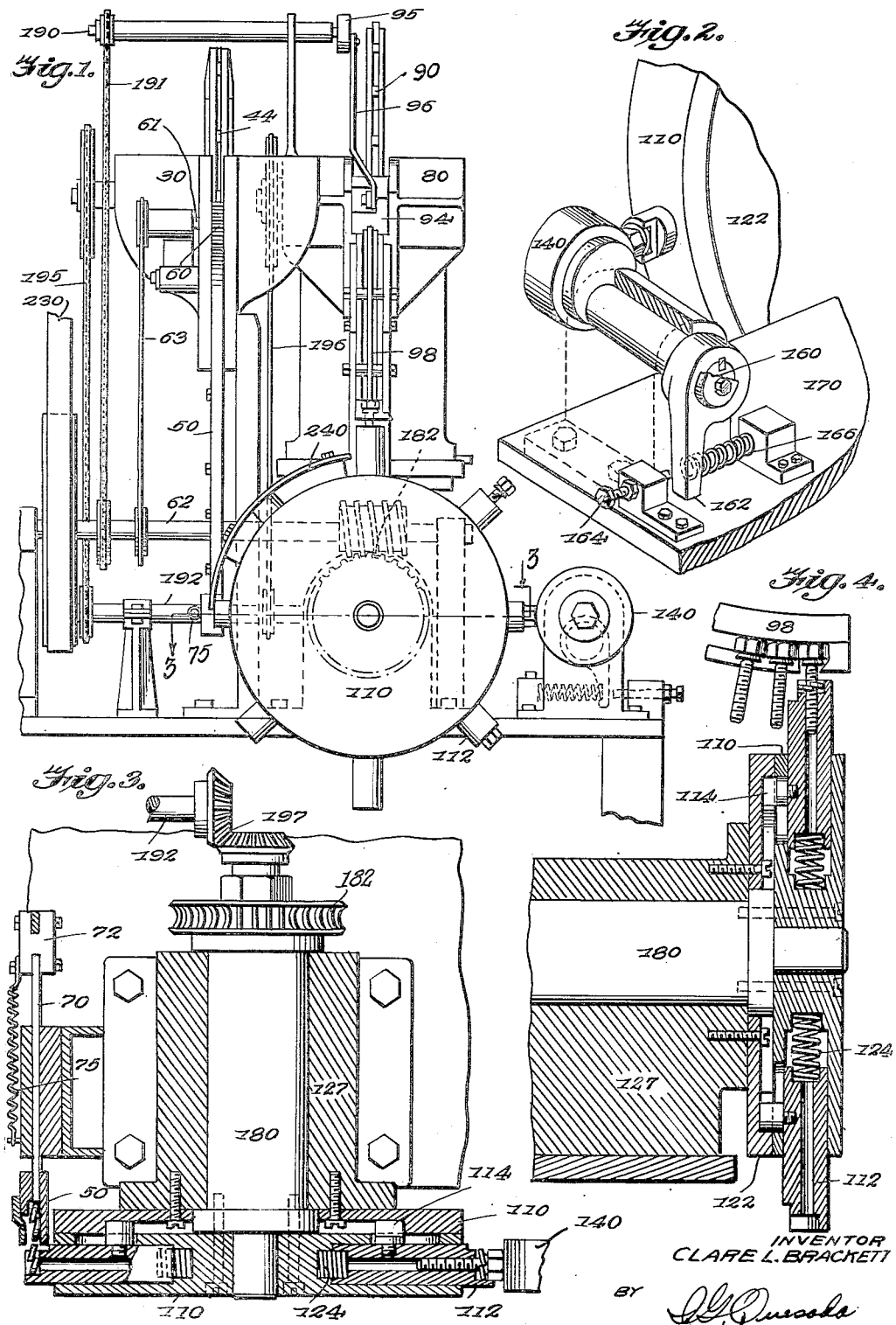

May 8, 1934.    C. L. BRACKETT    1,958,180
COUPLING MECHANISM FOR WASHERS AND HEADED FASTENERS
Original Filed Feb. 21, 1931    3 Sheets-Sheet 2
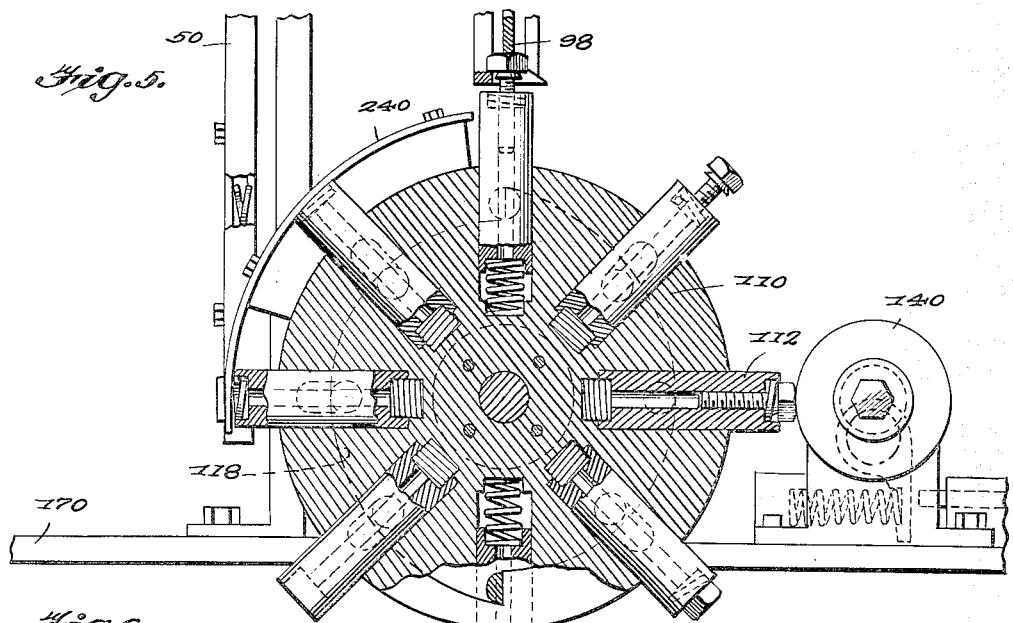
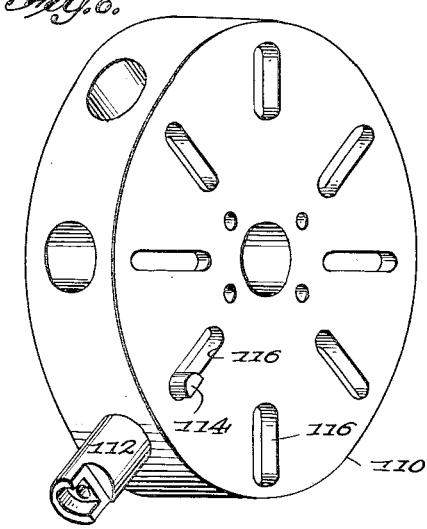
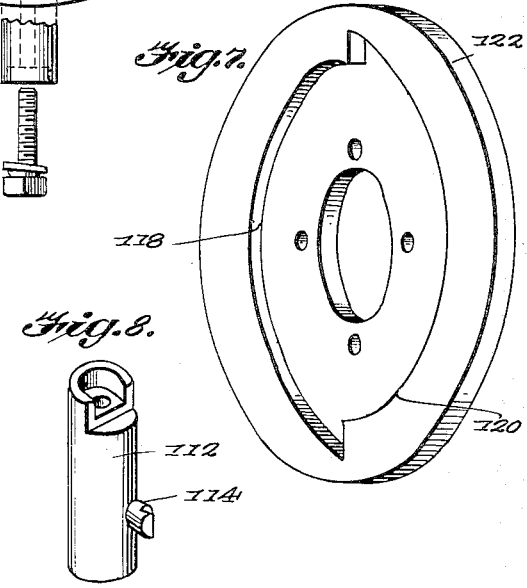
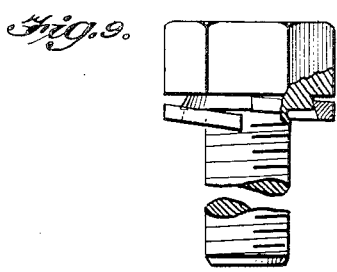
INVENTOR
CLARE L. BRACKETT
BY
ATTORNEY May 8, 1934. C. L. BRACKETT 1,958,180
COUPLING MECHANISM FOR WASHERS AND HEADED FASTENERS
Original Filed Feb. 21, 1931 3 Sheets-Sheet 3
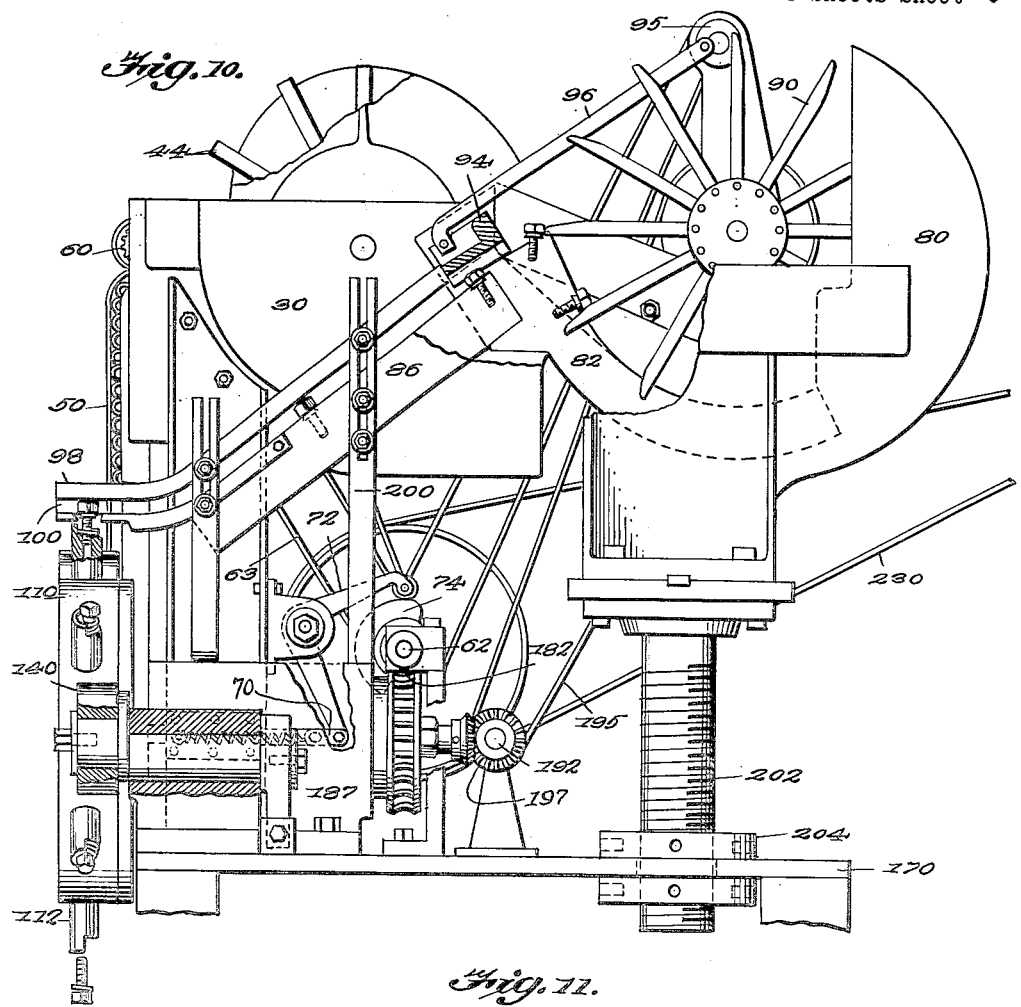
INVENTOR
CLARE L. BRACKETT
BY
ATTORNEY Patented May 8, 1934

1,958,180

UNITED STATES PATENT OFFICE 1,958,180

COUPLING MECHANISM FOR WASHERS AND HEADED FASTENERS

Clare L. Brackett, Detroit, Mich., assignor to National Machine Products Company, Detroit, Mich., a corporation of Michigan Original application February 21, 1931, Serial No. 517,576. Divided and this application July 13, 1932, Serial No. 622,341

13 Claims. (Cl. 29—84)

This invention relates to a means for coupling washers and screw products, such as cap screws and bolts and the application is a division of my co-pending application filed February 21, 1931, and serially numbered 517,576.

The invention forming the subject of this application contemplates simple and automatic means by which washers and headed fasteners, of whatever nature the latter happen to be, are brought into permanently coupled relation by an assembly mechanism to which these parts are furnished and from which the units thus created are later ejected into a suitable receiver; reliable provision being made to protect the assembly mechanism against damage as a result of the failure of the washers and headed fasteners to unite as intended.

Another feature of the invention will be found to reside in the means by which the machine may be adapted to use in connection with washers and headed fasteners of various sizes within commercial limits.

Other objects and advantages will be apparent during the course of the following description.

In the accompanying drawings, forming a part of this application and in which like numerals are employed to designate like parts throughout the same, Figure 1 is a front elevation of the machine, Figure 2 is a fragmentary perspective illustrating the means by which pressure is applied to previously associated washers and fasteners to force the washers into closely embracing relation to coupling portions or shoulders of the fasteners to permanently unite the washers and fasteners.

Figure 3 is a detail horizontal sectional view taken on line 3—3 of Figure 1,

Figure 4 is a detail transverse vertical sectional view through the coupling mechanism, the view illustrating the means by which headed fasteners are passed through the washers and by which the fasteners are transferred from the magazine therefor to the coupling mechanism, Figure 5 is a vertical sectional view through the washer and fastener coupling mechanism, the view being taken at right angles to the illustration in Figure 4, Figure 6 is a perspective of a coupling disc detached, Figure 7 is a perspective of a fixed cam adapted for cooperation with the assembly disc to control the movement of the washer and fastener carrying plungers mounted on the assembly disc, Figure 8 is a perspective illustrating one of the washer and fastener carrying plungers detached, Figure 9 is a fragmentary side elevation of a washer and cap screw coupled with the mechanism forming the subject of this invention, Figure 10 is a side elevation of the fastener handling side of the machine, Figure 11 is a fragmentary plan view of a fastener magazine embodied in the invention, Figure 12 is a detail longitudinal sectional view thru the fastener handling magazine, Figure 13 is a detail transverse sectional view taken on line 13—13 of Figure 11, In the drawings, wherein for the purpose of illustration is shown a preferred embodiment of the invention, the numeral 30 designates a hopper fully open at the top thereof for the reception of split helical washers. The hopper is provided with suitable means, such for example, of the kind shown in the herein identified copending application, for arranging the washers on edge in the path of travel of a washer feeding wheel 44, so that the rotation of the washer feeding wheel will bring about the advancement of the washers on edge to a magazine 50. The washer magazine 50 is in the nature of a longitudinally channeled vertically arranged member having constant communication with the hopper 30 to receive washers therefrom and as clearly shown in Figure 10, the washers are arranged in edge-to-edge relation in the magazine. Immediately above the point of transfer of the washers from the hopper 30 to the magazine 50, there is a spill wheel 60 having peripheral knobs or other means to engage surplus washers and return the same to the hopper.

The spill wheel 60 is mounted on a shaft 61 rotatably carried by a portion of the hopper 30 and having connection with what might be said to be a main drive shaft 62 through the intervention of a motion transmitting mechanism 63 of any appropriate character. It is believed to be clear that the spill wheel 60 is intended for rotation in a counterclockwise direction as viewed in Figure 10, so that the washers that would otherwise crowd at the point of transfer of the washers from the hopper to the magazine are returned to the hopper for subsequent feeding to the magazine.

Referring now to the means by which the washers are transferred individually from the magazine 50 to the coupling mechanism to be described, attention is invited to Figure 3, in which it is illustrated that the lower portion of the magazine is intersected intermittently by a longitudinally movable plunger 70 which, during the advance thereof, moves the contiguous washer from the magazine onto the washer seat of the coupling mechanism to be described. The plunger 70 has connection with one branch or arm of a bell crank 72 while the other branch of the bell crank is provided with a roller riding on a cam 74.

Rotation of the cam intermittently rocks the bell crank 72 and consequently retracts the plunger 70 and when the bell crank is released, the contractile coil spring 75 attached to the plunger serves to advance the plunger and thereby bring about the transfer of an individual washer from the magazine to the coupling mechanism. The cam 74 is mounted on the main drive shaft 62 and as will hereinafter appear, the main drive shaft has connection with other operative parts of the machine so that the necessary synchronization is provided.

Before describing the specific means by which the washers are coupled to the headed fasteners, brief reference will be made to the hopper and magazine arrangement for the headed fasteners, such arrangement being illustrated in Figures 10, 11, 12 and 13. In these figures, the hopper is designated by the numeral 80 and consists of more or less complemental sections having the adjacent portions thereof formed with generously proportioned connecting flanges 82 held in assembled and yet spaced relation in any suitable manner. The spacing of the flanges 82 defines a channel for the reception of the shanks of the fasteners being handled.

It might be noted that the channel formed for the passage of the headed fastener is preferably open at the bottom thereof to permit of the discharge of dirt, cuttings and the like, and at the same time to allow fasteners of various lengths to be handled.

As shown in Figure 10, the guide flanges 82 have the discharge edge portions thereof raised to form shoulders or humps substantially above the intended maximum level of fasteners in the hopper and from the peak thus formed, there is a decline to direct the headed fasteners into a magazine consisting principally of a pair of spaced guide plates 86. It is on the upper edges of the guide plates 86 that the heads of the fasteners ride.

It is further illustrated in Figure 10, that a fastener feeding spider or wheel 90 is rotatably mounted in the hopper 80 and is provided with a plurality of spoke-like arms movable through the channel defined by the members 82 to advance the headed washers therein.

The headed fasteners advanced by the member 90 are presented to the magazine and a spill block 94 is located immediately above the transfer of the headed fasteners from the hopper 80 to the associated magazine and has connection with a driven crank 95 through the intervention of a link 96. Clearly, rotation of the crank 95 brings about reciprocation of the block 94 so that the spill block, in turn, avoids congestion of headed fasteners at the point of transfer of these fasteners from the hopper to the magazine.

The magazine for the headed fasteners is shown to be inclined downward from the hopper 80 and the fasteners carried thereby are held in place by a retaining strip 98 arranged in the vertical plane of the channel through the magazine and immediately above the heads of the fasteners being handled.

Figure 10 illustrates that the lower portion of the magazine for the headed fasteners is extended more or less horizontally into overhanging relation to the coupling mechanism to be described, and the longitudinal channel through this magazine is formed with a short lateral outlet branch providing a means by which the fasteners may be picked up separately by the coupling mechanism.

Figures 11 and 12 illustrate that a transverse stop member 100 forms one wall of the lateral outlet for the headed fasteners and that the lower edge portion of this wall is extended inward on an angle to cooperate with the vertical portion of the wall in straightening the headed fasteners preparatory to the transfer of the same from the magazine to the coupling mechanism.

In describing the coupling mechanism for the washers and the headed fasteners, attention is invited first to Figures 1, 3, 4, 5 and 6, illustrating that such coupling mechanism embodies as an important part thereof, a disc-shaped rotary body or support 110 having an annular series of radial longitudinally movable plunger-like carriers 112. Figures 6 and 8 illustrate that the plunger-like carriers 112 are provided between the ends thereof with laterally projecting pins or lugs 114 movable through radial slots 116 in the support 110 and having alternate contact with the internal substantially semi-circular active faces or surfaces 118 and 120 of a fixed cam 122.

The cam surface 118 is on the washer magazine side of the machine and is spiraled inward toward the top of the cam so that as the plungers or carriers 112 approach the outlet from the washer magazine, the same will be retracted against the tension of expansion springs 124. The expansion springs 124 are shown to be confined between the inner ends of the plungers or carriers 112 and the inner ends of the sockets in which the plungers or carriers operate.

Figures 3, 4 and 8 illustrate that the outer ends of the carriers 112 are centrally recessed to form depressed or guarded seats for individual washers transferred from the washer magazine. The washer magazine sides of the various carriers 112 are fully open so as to allow of the lateral movement of individual washers from the magazine onto such seats, the transfer being accomplished through the intermittent advancement of the plunger 70 in the manner previously described.

With a washer thus furnished to the recessed outer end of a particular carrier 112 the uniform and constant rotation of the disk 112 in a clockwise direction as viewed in Figure 1 brings that carrier directly beneath and in line with the headed fastener arranged for discharge from the fastener magazine.

In Figure 5 it is clearly illustrated that simultaneously with the registration of a particular carrier 112 with the fastener above, the pin 114 of that carrier will be released by the adjacent end of the cam surface 118. This allows the associated spring 124 to move the carrier outward and thereby telescope the fastener immediately above. Of course, the object of such telescoping of the carrier 112 with the fastener above is to initially couple the fastener with the washer seated on that carrier. With the washer and the fastener thus loosely joined and mounted on a particular carrier 112, the disc 110 continues to turn and brings the head of the fastener into pressure contact with the periphery of an eccentrically mounted pressure medium 140.

The effect of the engagement of the head of the fastener with the pressure member 140 is to force the coupling shoulder or portion of the fastener through the split washer to permanently couple the washer and the fastener and thereby allow these parts to be handled together as a unit.

Coincident with the movement of a particular carrier 112 from the fastener loading position to the pressure applying position, that carrier is retracted through the engagement of the pin 114 thereof with the cam 120 so that by the time the carrier reaches the pressure applying position, the inner end of such carrier is firmly backed by a shouldered portion of the wall of the socket in which the same operates. Continued rotation of the disc 110 will convey a particular carrier 112 beyond the pressure member 140 and the cam surface 120 will continue to hold the carrier in retracted position until the end of the cam 120 is reached at which time the carrier is abruptly released and the associated spring 124 allowed to move the carrier 112 out with a snap action so that when it hits the adjacent surface of the cam edge 118, the previously coupled washer and headed fastener will be forcibly ejected.

As shown in Figure 2, the pressure applying member 140 is mounted on one end of a shaft 160, the other end of the shaft being provided with an arm or crank 162 urged against a set screw by an expansion spring 166. If for any reason the washer and the fastener are not fully united by the member 140, the spring 166 will yield to avoid damage to the machine.

The set screw 164 provides simple means by which the pressure applying unit 140 may be adjusted with respect to the heads of the fasteners being handled. It is shown in Figure 5 that the pressure applying unit 140 and associated parts are mounted on the base 170 of the machine.

At this point it is noted that synchronization between the disc 110 and the washer feeding plunger 70 is necessary to assure feeding of individual washers to the members 112 as the latter successively reach the washer loading position. In this connection, attention is invited to Figure 3 illustrating that the disc 110 is mounted on a shaft 180 operatively connected to the main drive shaft 62 by a worm and worm wheel connection 182.

As previously described, the cam 74 is mounted on the main drive shaft 62 so that automatic timing as between the disc 110 and the cam 74 is provided. Clearly, the cam 74 may be adjusted circumferentially on the shaft 64 to provide for the retraction and subsequent release of the plunger 70 in the proper order with respect to the carrier conveying support 110. Incidentally, Figure 3 illustrates that the cam 122 is rigidly secured to the bearing 127 through which the shaft 180 extends.

With reference to Figure 1, it will be observed that the eccentric or crank 95 for reciprocating the spill block 94 is mounted on a shaft 190 operatively connected to the main drive shaft 62 through a motion transmitting mechanism 191.

Referring now to Figure 1, it will be seen that the washer feeding wheel 44 has operative connection with what might be said to be a counter shaft 192 through the intervention of a motion transmitting mechanism 195 of any nature. The counter shaft 192 also has driving connection with the feeding wheel 90 through another motion transmitting mechanism 196. The shaft 192 by which the feeding devices 44 and 90 are operated has driving connection with the main motion transmitting shaft 62 through a beveled gear connection 197, attention in this regard being invited to Figure 3, in which it is illustrated that one of the beveled gears 197 is mounted on the inner end of the shaft 180. Of course, as previously described, the shaft 180 has operative connection with the main drive shaft 62 through the intervention of the worm and worm wheel connection 182 and by taking the drive for the feeding devices 44 and 90 off the shaft 180, the revolutions per minute of such feeding devices are much less than the revolutions per minute of the carrier support 110. Relatively lower speeds on the part of the feeding devices 44 and 90 provide an ample supply of washers and screw products to the coupling mechanism.

In Figure 10, the fastener mechanism is shown to be adjustably supported by standards 200 suitably mounted on the machine. The standards 200 provide a means by which the lower portion of the fastener magazine may be adjusted with respect to the coupling mechanism to provide for the proper positioning of the headed fasteners to be picked up by the carriers 112. Adjustment of the magazine for the headed fasteners may also require adjustment of the hopper 80 and thus, this hopper is mounted on a post 202 adjustably attached to the base 170 of the machine by ring nuts 204 or other suitable fastening devices.

By way of brief review, it is pointed out that a suitable supply of washers is placed in the hopper 30, while a quantity of headed fasteners are furnished to the hopper 80. When operation is started, by transmitting power to the main drive shaft 62 through a driving means 230 of any nature, the feeding device 44 will be turned in a clockwise direction as viewed in Figure 10 to furnish a supply of washers in edge-to-edge relation to the magazine 50, while the feeding device 90 will be rotated in a similar direction to transfer a quantity of headed fasteners from the hopper 80 to the associated magazine.

The washers are transferred individually from the washer magazine 50 to the recessed seats in the outer ends of the carriers 112, such transfer being accomplished through intermittent operation of the bell crank 72. Of course, the carrier 110 is rotated at a uniform speed and in a clockwise direction, as viewed in Figure 1, to conduct the carriers 112 from the washer loading position to the fastener loading position. During the major portion of such movement of the carriers, the washers mounted on the seats thereof are overhung by a fixed arcuate guard 240, terminating just short of the fastener loading position. Figure 1 illustrates that the arcuate guard extends closely over the outer ends of the carriers to prevent accidental loss of the washers. When each washer loaded carrier 112 reaches the fastener loading position it is instantly released and moved outward by the associated spring 124 to telescope and pick up the fastener above. In this connection, attention is invited to Figure 4 in which it is illustrated that each carrier 112 is bored longitudinally or is formed with a socket of ample depth and width to freely receive the fastener above.

As the carrier 110 continues its rotation, it removes the fastener just engaged from the outlet portion of the fastener magazine and conducts the initially and loosely coupled fastener and washer to the pressure applying medium 140, where the coupling operation is completed.

However, should there be a failure of the washer and the fastener to unite in the manner intended, the pressure medium 140 yields to allow the continued turning of the carrier support 110 without damage to any of the parts of the machine. From the pressure applying position the fully coupled fasteners and washers are conducted to the discharging position which, of course, is at the bottom of the disc 110. When the carriers 112 reach the lowermost position, the arms or pins 114 thereof drop or ride off the cam surface 120 so as the springs 124 are allowed to move the carriers outward with a snap action so that when the pin 114 encounters the lower portion of the cam edge 118 the carriers are stopped abruptly in their radial movement with the result that the coupled cap screws and washers are forcibly ejected into a suitable receiver located below.

Having thus described the invention, what is claimed is:

1. In a machine for coupling washers and headed fasteners, a plurality of carriers having seats for washers, a washer feeding assembly having means to successively feed washers to said seats, a fastener feeding assembly, there being means by which the washers and the fasteners are telescoped, and a pressure medium to further adjust the relation between the previously associated washers and fasteners, said carriers being provided with openings at points beyond said seats and substantially concentric thereto to receive portions of the headed fasteners and steady such fasteners.

2. In a machine for coupling washers and headed fasteners, a plurality of carriers for washers, a washer feeding assembly having means to successively feed washers to said carriers, a fastener feeding assembly, means associated with said carriers to move the same endwise to cause the washers carried thereby to telescope the fasteners furnished by said fastener feeding assembly, and means to further adjust the relation between the previously associated washers and fasteners, said carriers having means to steady the fasteners during the telescoping operation.

3. In a machine for coupling washers and headed fasteners, a rotatable support, carriers movably associated with said support and having washer supporting seats and openings extending beyond said seats for the reception of the shanks of headed fasteners to steady the fasteners, a fastener feeding mechanism, means to cause the shanks of the headed fasteners to enter the shank receiving openings of said carriers to telescope the washers and the shanks, and additional means to further adjust the relation between the washers and said fasteners.

4. In a machine for coupling washers and headed fasteners, a support, carriers on said support and being movable endwise, springs associated with said carriers to move the same endwise, a washer feeding assembly to furnish washers to said carriers, means to temporarily retract said carriers against the tension of said springs and to allow of the release of the same at the fastener loading position to allow said springs to move the holders outward into telescopic relation with a previously arranged fastener, and a pressure medium to further adjust the relation between the fasteners and the washers, said endwise movable carriers having means receiving portions of the headed fasteners and steadying the headed fasteners during the telescoping operation.

5. In a machine for coupling washers and headed fasteners, a movable support, carriers movably mounted on said support and having washer and fastener supporting and conducting means, a pressure medium in the path of travel of the fasteners mounted on said carriers and having means to unite the washers and fasteners, and a washer supply assembly in feeding relation to said carrier.

6. In a machine for coupling washers and headed fasteners, a movable support, carriers mounted radially and movably on said support and having washer and fastener supporting and conducting means, a pressure medium in the path of travel of the fasteners mounted on said carriers and having means to unite the washers and fasteners, a washer supply assembly in feeding relation to said carrier, and means synchronizing the action of said movable support and said washer supply assembly.

7. In a machine for coupling washers and headed fasteners, a movable support, endwise movable carriers mounted on said support and having washer and fastener supporting means, means to move the carriers endwise to cause the washers mounted on said carriers to embrace fasteners and simultaneously connect the fasteners to the carriers, and a driving mechanism having operative connection with said washer supply assembly and said movable support.

8. In a machine for coupling washers and headed fasteners, a rotatable support having sockets opening out through one surface thereof, carriers movably mounted in said sockets, springs in said sockets and engaged with said carriers to urge the same outward, a washer supply assembly in feeding relation to said carriers, a supply and holding means for headed fasteners, a cam having means to retract the carriers and subsequently release the same to allow said springs to move the same outward into telescopic relation with a headed fastener whereby the washers mounted on the carriers are caused to embrace the fasteners, a driving mechanism for said rotary support, and a yieldable pressure medium to engage the heads of said fasteners and further adjust the relation between the fasteners and the washers.

9. In a machine for coupling washers and headed fasteners, a rotatable support having sockets opening out through one surface thereof, carriers movably mounted in said sockets, springs in said sockets and engaged with said carriers to urge the same outward, a washer supply assembly in feeding relation to said carriers, supply and holding means for headed fasteners, a cam having means to retract the carriers and subsequently release the same to allow said springs to urge the same outward into telescopic relation with a headed fastener whereby the washers mounted on the carriers are caused to embrace the fasteners, a driving mechanism for said rotary support, a yieldable pressure medium to engage the heads of said fasteners to further adjust the relation between the fasteners and washers, there being means to retract the carriers during travel between the fastener loading position and the pressure applying position and to subsequently release the carriers to allow the springs associated therewith to move the carriers outward.

10. In a machine for coupling washers and headed fasteners, a rotatable support having sockets opening out through one surface thereof, carriers movably mounted in said sockets, means engaged with said carriers to urge the same outward, a washer supply assembly in feeding relation to said carriers, a supply and holding means for headed fasteners, a cam having means to retract said carriers and abruptly release the same for outward movement to cause the carriers to move into telescopic relation with the headed fasteners whereby the washers mounted on the carriers are caused to embrace the fasteners, and a driving mechanism for said rotatable support.

11. In a machine for coupling washers and headed fasteners, a rotatable support having sockets opening out through one surface thereof, carriers movably mounted in said sockets, means engaged with said carriers to urge the same outward, a washer supply assembly in feeding relation to said carriers, a supply and holding means for headed fasteners, a cam having means to retract said carriers and abruptly release the same for outward movement to cause the carriers to move into telescopic relation with the headed fasteners whereby the washers mounted on the carriers are caused to embrace the fasteners, and a driving mechanism for said rotatable support, there being means to retract the carriers during travel between the fastener loading position and a discharge position and to subsequently release the carriers for abrupt outward movement.

12. In a machine for coupling washers and headed fasteners, a movable support, carriers mounted on said support to move therewith and being movable individually, means to urge the carriers outward, a washer supply assembly in feeding relation to said carriers, a supply and holding means for headed fasteners, a cam having means to retract said carriers and abruptly release the same for outward movement to cause the carriers to move into telescopic relation with the headed fasteners whereby the washers mounted on the carriers are caused to embrace the fasteners, and a driving mechanism for said support.

13. In a machine for coupling washers and headed fasteners, a support, carriers mounted on said support and being movable with respect to the support and with respect to each other, means to urge the carriers outward, a washer supply assembly in feeding relation to said carriers, a supply and holding means for headed fasteners, means to retract said carriers and subsequently release the same for outward movement to cause the carriers to move into telescopic relation with the headed fasteners whereby the washers mounted on the carriers are caused to embrace the fasteners, said carriers being provided with means to steady the headed fasteners.

CLARE L. BRACKETT.